United States Patent
Oh et al.

(10) Patent No.: US 8,271,675 B2
(45) Date of Patent: Sep. 18, 2012

(54) REMOTE CONTROL APPARATUS AND METHOD

(75) Inventors: Seung-Jae Oh, Seoul (KR); Kyung-Mo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 12/035,841

(22) Filed: Feb. 22, 2008

(65) Prior Publication Data

US 2008/0243998 A1    Oct. 2, 2008

Related U.S. Application Data (60) Provisional application No. 60/920,833, filed on Mar. 30, 2007.

(30) Foreign Application Priority Data

Oct. 23, 2007 (KR) .................. 10-2007-0106833

(51) Int. Cl.
*G06F 3/048* (2006.01)
*G06F 15/16* (2006.01)

(52) U.S. Cl. .................. 709/231; 709/203; 709/219

(58) Field of Classification Search .................. 709/231, 709/201–203, 217–219, 230; 715/205, 249, 715/273
See application file for complete search history.

(56) References Cited

U.S. PATENT DOCUMENTS

| | | | |
|---|---|---|---|
| 6,314,326 B1 | 11/2001 | Fuchu | |
| 6,751,623 B1 * | 6/2004 | Basso et al. ........................ | 1/1 |
| 6,965,947 B1 * | 11/2005 | Hild et al. ..................... | 709/246 |
| 7,565,676 B2 * | 7/2009 | Bell ............................. | 725/105 |
| 7,734,289 B2 * | 6/2010 | Shaw et al. .................. | 455/432.1 |
| 2003/0020726 A1 * | 1/2003 | Charpentier .................. | 345/603 |
| 2003/0112274 A1 | 6/2003 | Gao et al. | |
| 2004/0267900 A1 * | 12/2004 | Hoekstra et al. ............. | 709/217 |
| 2006/0174026 A1 * | 8/2006 | Robinson et al. ............ | 709/231 |
| 2006/0218650 A1 | 9/2006 | Costa-Requena et al. | |
| 2006/0232573 A1 * | 10/2006 | Nitta et al. ................... | 345/204 |
| 2007/0005727 A1 | 1/2007 | Edwards et al. | |
| 2011/0314500 A1 | 12/2011 | Gordon et al. | |

FOREIGN PATENT DOCUMENTS

| | | |
|---|---|---|
| JP | 2000513177 A | 10/2000 |
| JP | 2003524307 A | 8/2003 |
| JP | 2006236323 A | 9/2006 |
| JP | 2007042118 A | 2/2007 |
| JP | 2008527851 A | 7/2008 |
| KR | 10-2004-0000223 A | 1/2004 |
| WO | 2006074110 A2 | 7/2006 |

OTHER PUBLICATIONS

Communication, dated Oct. 26, 2011, issued by the State Intellectual Property Office of P.R. China in corresponding Chinese Application No. 200880010832.4. Communication dated Mar. 27, 2012 issued by the Japanese Patent Office in counterpart Japanese Patent Application No. 2010-500828.
English-Language Translation for Communication dated Mar. 27, 2012 issued by the Japanese Patent Office in counterpart Japanese Patent Application No. 2010-500828.

* cited by examiner

*Primary Examiner* — Wing Chan
*Assistant Examiner* — Ruolei Zong
(74) *Attorney, Agent, or Firm* — Sughrue Mion, PLLC (57) ABSTRACT

A remote control apparatus and method are provided. The remote control apparatus includes a user interface (UI) server which transmits a UI having a multimedia data format, and a UI client which displays the UI, receives a user command and controls the UI server according to the received user command. The remote control method includes enabling a UI server to transmit a UI having a multimedia data format to a UI client, enabling the UI client to display the UI, and enabling the UI client to control the UI server by transmitting a user command received through the UI to the UI server.

12 Claims, 6 Drawing Sheets

REMOTE CONTROL APPARATUS AND METHOD

CROSS-REFERENCE TO RELATED PATENT APPLICATIONS

This application claims priority from U.S. Provisional Application No. 60/920,833, filed on Mar. 30, 2007 in the United States Patent and Trademark Office, and Korean Patent Application No. 10-2007-0106833, filed on Oct. 23, 2007 in the Korean Intellectual Property Office, the disclosures of which are incorporated herein by reference in their entirety.

BACKGROUND OF THE INVENTION

1. Field of the Invention

Apparatuses and methods consistent with the present invention relate to a remote control technology, and more particularly, to a remote control technology in which a user interface (UI) having a multimedia data format is used to perform a remote control operation.

2. Description of the Related Art

Recently, as the use and demand for wireless communication are increasing, various types of wireless communication technologies are being developed.

Related art technologies using the CEA-2014 (Web4CE) standard to remotely control a device connected to a home network are known.

Figure 1:
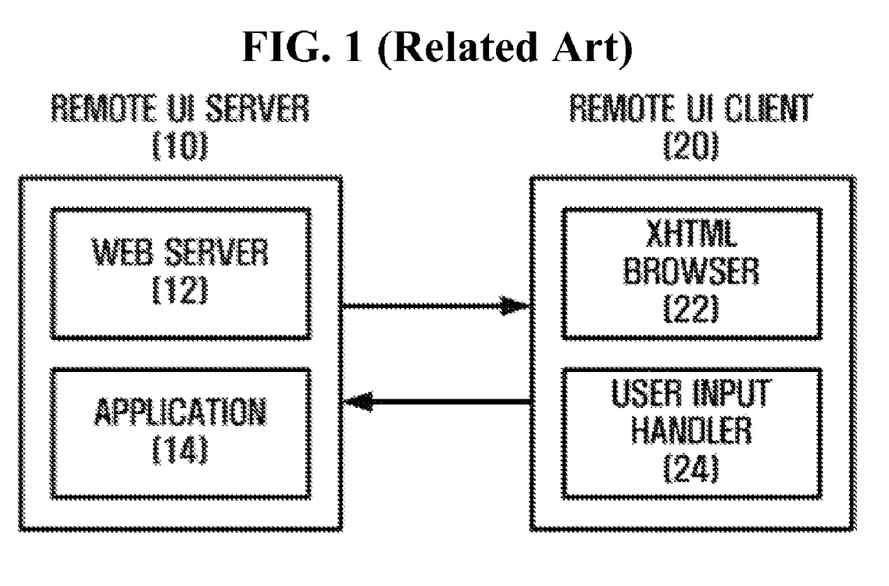
FIG. 1 illustrates a block diagram of a related art remote control apparatus.

FIG. 1 illustrates a block diagram of a related art remote control apparatus. Referring to FIG. 1, the related art remote control apparatus implemented with the CEA-2014 standard includes a remote user interface (UI) server 10 which provides a user interface for a remote control operation and a remote UI client 20 which displays the user interface provided by the remote UI server 10.

The remote UI server 10 includes a web server and can thus transmit a web page requested by the remote UI client 20 by using the web server. The remote UI client 20 displays the web page of the user interface provided by the remote UI server 10 by using an Extensible HyperText Markup Language (XHTML) browser.

In the CEA-2014 standard, web pages are created using CE-HTML which is a type of XHTML optimized for consumer electronics (CE) devices. A user may combine a number of information related to different interests using an input device provided by a remote UI client and transmits the combined information to a remote UI server using the Hypertext Transfer Protocol (HTTP) protocol. Then, the web server of the remote UI server receives the information transmitted by the user and controls an application provided by the remote UI server.

However, the related art remote control technique of FIG. 1 has the following disadvantages.

Since the related art remote control technique of FIG. 1 provides a user with an XHTML user interface via a web server, there is a limit to the types of user interfaces that can be provided. That is, CE-HTML is insufficient to properly display rich multimedia-type user interfaces. In order to address this, the web browser is required provide a considerable number of functions. This requirement, however, increases the burden on the remote UI client.

The CEA-2014 standard provides additional functions to that provided by the HTML standard, which enables a dynamic update according to modifications made by the remote UI server. Due to these additional functions, the remote UI client must provide a browser for displaying remote user interfaces as well as a browser for displaying conventional HTML web pages.

In addition, in order for the remote UI client to provide a user with the optimum user interface, the remote UI server must create web pages in consideration of whether or not the remote UI client supports high resolution. Otherwise, the sharpness of user interface may decrease and noise may be generated.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a remote control apparatus and method, in which a UI having a multimedia data format is provided using a multimedia streaming method and a remote device is controlled according to user input by using the user interface.

According to an aspect of the present invention, there is provided a UI server including: an encoder which encodes a UI in a multimedia data format; and a streaming server which transmits the encoded UI to a remote client by using a multimedia streaming method.

According to another aspect of the present invention, there is provided a UI client including: a decoder which receives a UI having a multimedia data format from a remote server and decodes the received UI; and a UI output module which outputs the decoded UI to a user.

According to another aspect of the present invention, there is provided a remote control apparatus including: a UI server which transmits a UI having a multimedia data format; and a UI client which displays the UI, receives a user command and controls the UI server according to the received user command.

According to another aspect of the present invention, there is provided a remote control method including: enabling a UI server to transmit a UI having a multimedia data format to a UI client; enabling the UI client to display the UI; and enabling the UI client to control the UI server by transmitting a user command received through the UI to the UI server.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

The various aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
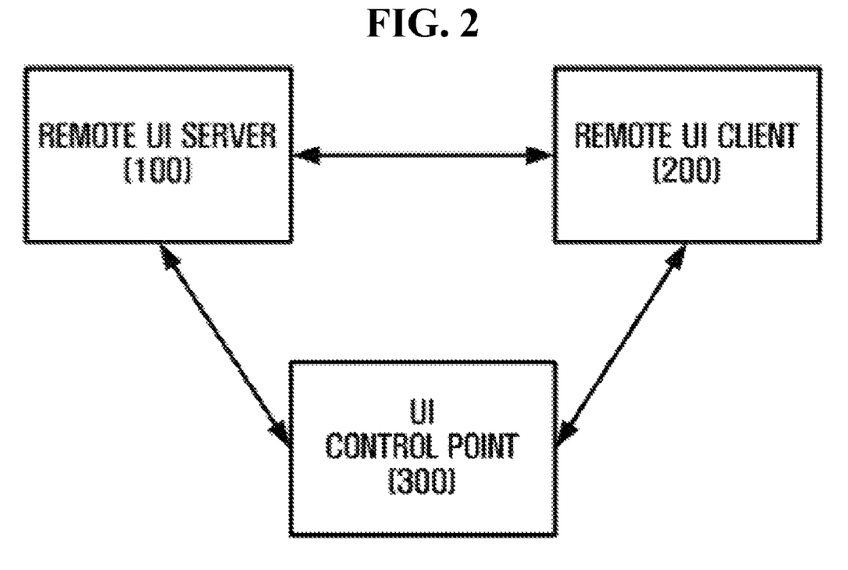
FIG. 2 illustrates a block diagram of a remote control apparatus according to an exemplary embodiment of the present invention.

FIG. 2 illustrates a block diagram of a remote control apparatus according to an exemplary embodiment of the present invention. Referring to FIG. 2, the remote control apparatus may include a remote UI server 100, a remote UI client 200 and a UI control point 300.

The remote UI server 100 may provide a user interface (UI) having a multimedia data format for remotely controlling a device connected to a communication network.

The remote UI client 200 may display the UI provided by the remote UI server 100 and control the remote UI server 100 according to a command input by a user. The remote UI client 200 may be a portable multimedia device such as a mobile phone, a personal digital assistant (PDA), or a Moving Picture Experts Group (MPEG)-1 Audio Layer 3 (MP3) player or may be a non-portable multimedia device such as a computer or a digital television (TV).

The UI control point 300 searches and then controls the remote UI server 100 and the remote UI client 200.

In order for a user to remotely control a device connected to a communication network, a protocol for searching the device is needed.

More specifically, a Universal-Plug-and-Play (UPnP) search operation may be used to search a device on a network. For example, if the remote UI server 100 is a UPnP device, a user may search the remote UI server 100 by performing a UPnP search operation using a UPnP control point. Here, the UI control point 300 may be provided in the remote UI client 200.

The remote UI server 100 may provide uniform resource identifier (URI) information which enables the remote UI client 200 to receive a UI using a multimedia streaming method while searching the remote UI client 200. Therefore, the remote UI client 200 may access a streaming server 120 of the remote UI server 100 and receive a UI from the streaming server 120 by using the URI information.

Figure 3:
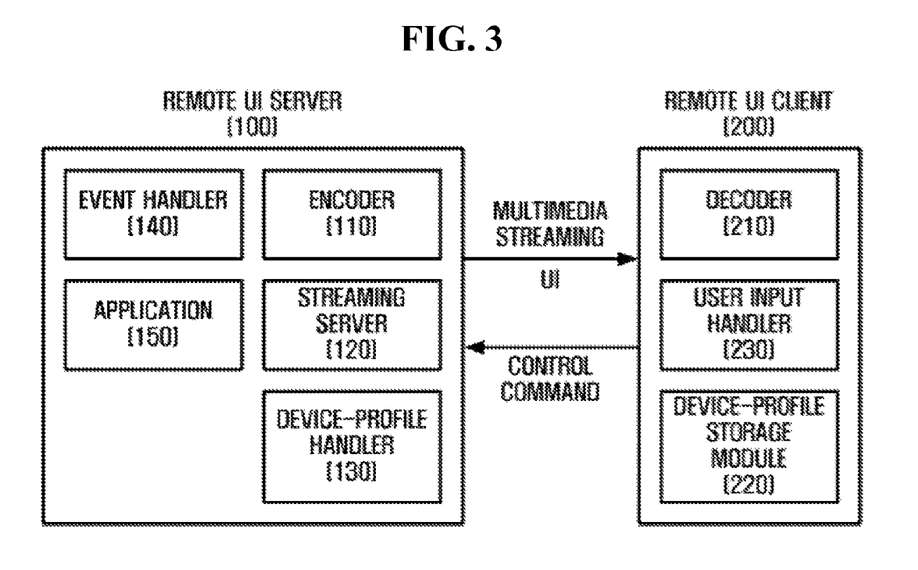
FIG. 3 illustrates a block diagram of a remote UI server and a remote UI client shown in FIG. 2.

FIG. 3 illustrates a block diagram of the remote UI server 100 and the remote UI client 200 shown in FIG. 2. Referring to FIG. 2, the remote UI server 100 may include an encoder 110, the streaming server 120, a device-profile handler 130 and an event handler 140.

The encoder 110 may encode a dynamically configured UI in a multimedia data format. That is, in order to control an application 150 provided by the remote UI server 100, a UI having the format of multimedia content may be transmitted to the remote UI client 200 by the remote UI server 100. The application 150 may be a function provided by the remote UI server 100 and may have various formats according to the types of application programs provided by the remote UI server 100.

Examples of the multimedia data format include a text format, a still image format, a moving image format, an animation format and a audio format.

The multimedia data format may be an MPEG format.

The streaming server 120 may transmit a UI having a multimedia data format to the remote UI client 200 using a multimedia streaming method.

Here, the multimedia streaming method may be a method of reproducing voice data, image data or animation data in real time using the Internet. Multimedia data such as MPEG data may be transmitted using the multimedia streaming method.

In the exemplary embodiment of FIGS. 2 and 3, the remote UI server 100 can provide a UI having a multimedia data format using a multimedia streaming method. Therefore, it is possible to display a rich multimedia-type UI desired by a user. In addition, since a browser is not necessary for viewing web pages, it is possible to reduce the burden on the remote UI client 20.

The streaming server 120 may receive a user command from the remote UI client 200 via a UI and control the application 150, which is provided by the remote UI server 100, according to the user command. The user command may be transmitted to the streaming server 120 using a streaming method, i.e., an upstream method.

The device-profile handler 130 may receive a device profile including capability information of the remote UI client 200 and generate optimum UI information based on the capability information.

More specifically, the device-profile handler 130 receives device-profile information regarding the remote UI client 200, performs capability matching using the device-profile information, and search for and transmit optimum UI information, if any, for the capability of the remote UI client 200. The device-profile handler 130 may transcode existing UI information into UI information suitable for the capability of the remote UI client 200 in real time and transmit the UI information obtained by the transcoding.

An MPEG format, which can be used as the format of a UI in the exemplary embodiment of FIGS. 2 and 3, may use vector graphic-based scene description information, instead of bitmap scene description information. In this case, it is possible to automatically display a UI compatible with the resolution of the remote UI client 200 without requiring additional capability matching and thus to provide an optimum UI.

In the related art, a remote UI server must provide a remote UI client with web pages that are compatible with the capability of the remote UI client, e.g., the resolution of the remote UI client, in order for the remote UI client to provide a UI desired by a user.

However, in the exemplary embodiment of FIGS. 2 and 3, the remote UI server 100 may provide an optimum UI for the capability of the remote UI client 200.

In addition, since an MPEG format, which can be used as the format of a UI in the exemplary embodiment of FIGS. 2 and 3, may use vector graphic-based scene description information, it is possible to automatically provide an optimum UI for the resolution of the remote UI client 200.

The event handler 140 may process a variation in the state of the application 150 or a notification input thereto from an external source and may thus notify the remote UI client 200 of an update state of a UI.

The remote UI client 200 may include a decoder 210, a device-profile storage module 220, a UI output module (not shown), and a user input handler 230.

The decoder 210 may decode a UI which is received from the remote UI server 100 and has a multimedia data format. The decoder 210 may include a rendering device which renders a UI.

The rendering device may render a UI having a multimedia data format using a scene description included in the multimedia data format of the UI. If the multimedia data format is an MPEG format, the rendering device may decode MPEG data and render the decoded MPEG data by combining media objects of the decoded MPEG data using a scene description and an object description included in the decoded MPEG data. Each of the media objects may serve as a UI. The scene description included in the decoded MPEG data may include a control command for controlling the functions of a remote device.

The device-profile storage module 220 may store capability information of the remote UI client 200 (particularly, capability information of the UI output module of the remote UI client 200), which is necessary for receiving an optimum UI from the remote UI server 100. For example, the device-profile storage module 220 may store a device profile regarding the resolution of the UI output module of the remote UI client 200 as the capability information of the remote UI client 200.

The UI output module may output a UI that has already decoded and rendered to a user. The UI output module may be a module equipped with a tool for displaying an image such as a cathode ray tube (CRT), a liquid crystal display (LCD), a light-emitting diode (LED), an organic LED (OLED) or a plasma display panel (PDP) and may thus be able to display a UI.

A user may input a control command to the remote UI client 200 through a UI output by the UI output module. The control command input by the user may be transmitted to the remote UI server 100 so that the application 150 provided by the remote UI server 100 can be controlled.

The user input handler 230 processes a user command input to the remote UI client 200 through a UI. That is, the user input handler 230 may control the remote UI client 200 to process information input thereto with the aid of an input device such as a mouse or a keyboard by a user.

If the format of a UI is an MPEG format, each media object included in MPEG data may serve the functions of a UI. Also, a scene description included in the MPEG format may include a control command for controlling the functions of a remote device. Therefore, the user input handler 230 may call a control command from a scene description included in a multimedia data format of a UI and control the functions of a remote device corresponding to the UI according to the control command.

The term "module", as used herein, means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

A remote control method according to an exemplary embodiment of the present invention will hereinafter be described in detail.

Figure 4:
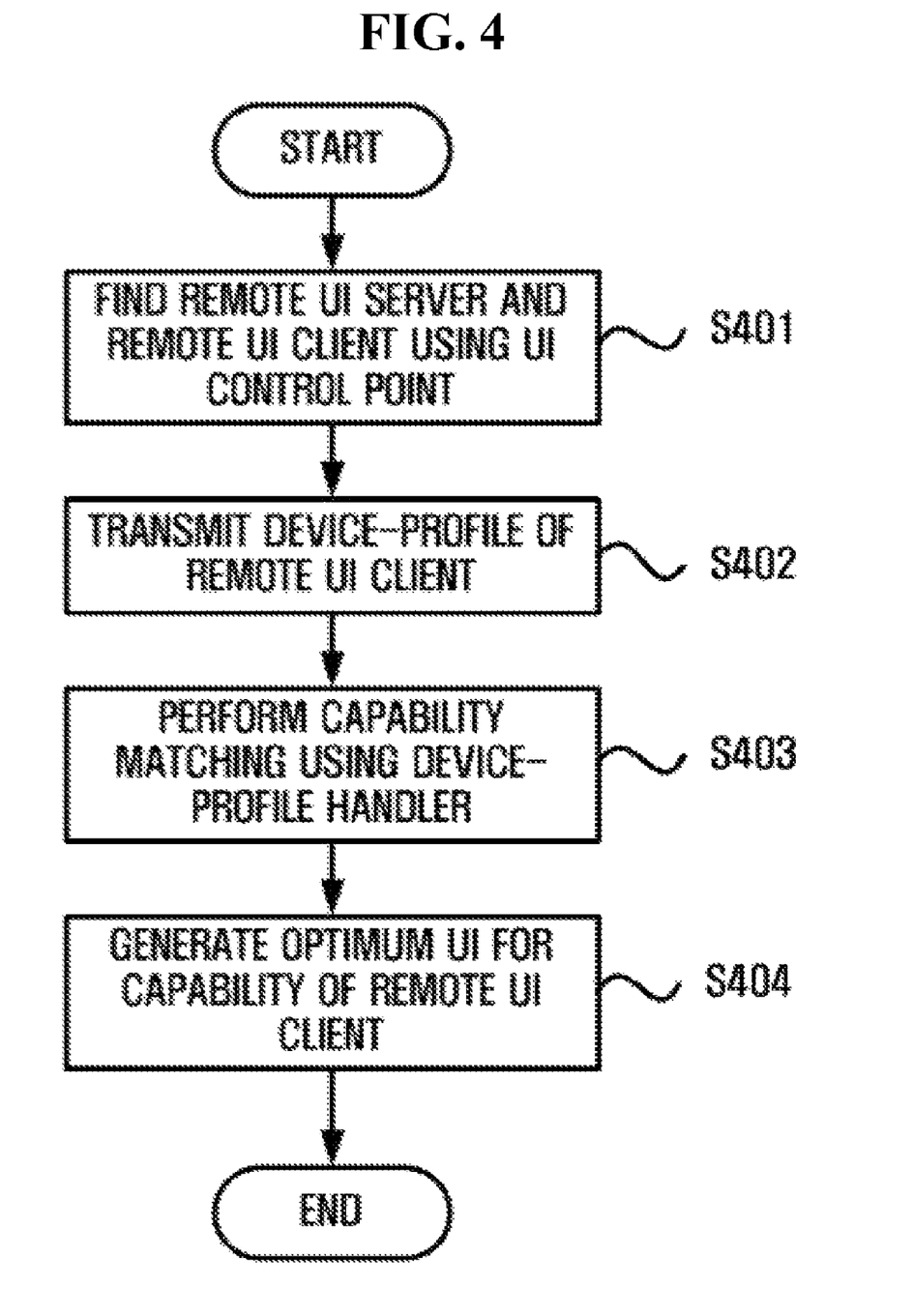
FIG. 4 illustrates a flowchart of the generation of a user interface having a multimedia data format by the remote control apparatus shown in FIG. 2.

FIG. 4 illustrates a flowchart of the generation of a UI having a multimedia data format by the remote control apparatus shown in FIG. 2. Referring to FIG. 4, a user finds the remote UI server 100 and the remote UI client 200 by using the UI control point 300 (S401). If the remote UI server 100 is a UPnP device, the user may search the remote UI server 100 by performing a UPnP search operation using the UPnP control point 300. Here, the UI control point 300 may be provided in the remote UI client 200. In this case, the user may not necessarily have to search the remote UI client 200.

Once the remote UI server 100 and the remote UI client 200 are detected, the remote UI client 200 transmits device-profile information regarding the remote UI client 200 to the remote UI server 100 (S402) in order for the remote UI client 200 to display a UI provided by the remote UI server 100 to a user in an optimum state. Thereafter, the remote UI server 100 receives device-profile information of the remote UI client 200, and the device-profile handler 130 performs capability matching based on the received device-profile information (S403).

In the exemplary embodiment of FIG. 4, vector graphic-based scene description information included in an MPEG format, which can be used as a multimedia data format of a UI, may be used. In this case, it is possible to automatically provide an optimum UI for the resolution of the remote UI client 200 without requiring capability matching (S404).

Figure 5:
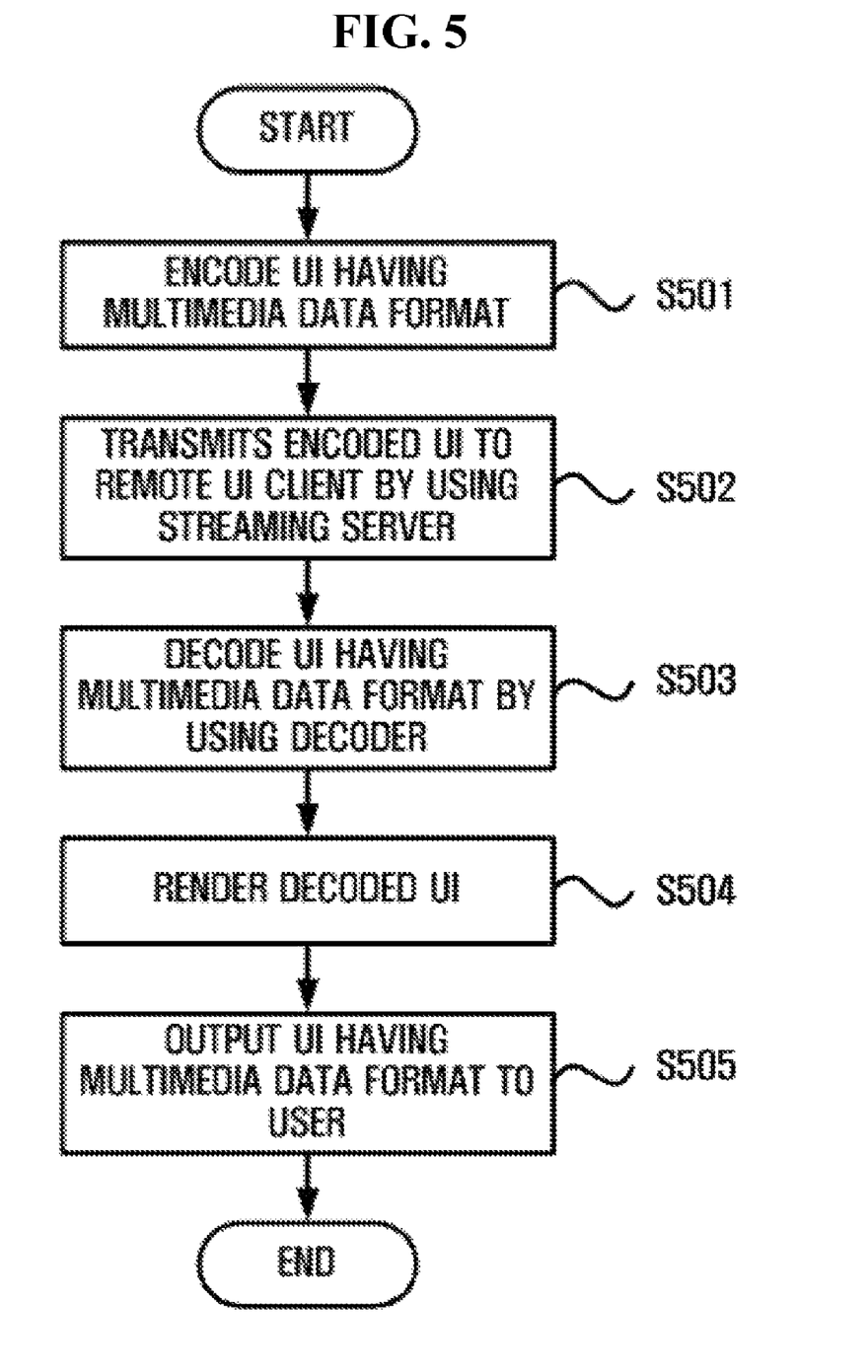
FIG. 5 illustrates a flowchart of the transmission and output of a user interface having a multimedia data format by the remote control apparatus shown in FIG. 2.

FIG. 5 illustrates a flowchart of the transmission and output of a UI having a multimedia data format by the remote control apparatus shown in FIG. 2. Referring to FIG. 5, the encoder 110 of the remote UI server 100 encodes a dynamically configured UI in a multimedia data format (S501). The UI having the multimedia format may be multimedia content such as MPEG data.

The streaming server 120 of the remote UI server 100 transmits the encoded UI to the remote UI client 200 by using a multimedia streaming method (S502).

The decoder 210 of the remote UI client 200 decodes the UI transmitted by the remote UI server 100 (S503). Thereafter, the rendering device of the decoder 210 renders the decoded UI using a scene description included in the multimedia data format of the decoded UI (S504).

Thereafter, the UI output module of the remote UI client 200 outputs the rendered UI to a user (S505).

Figure 6:
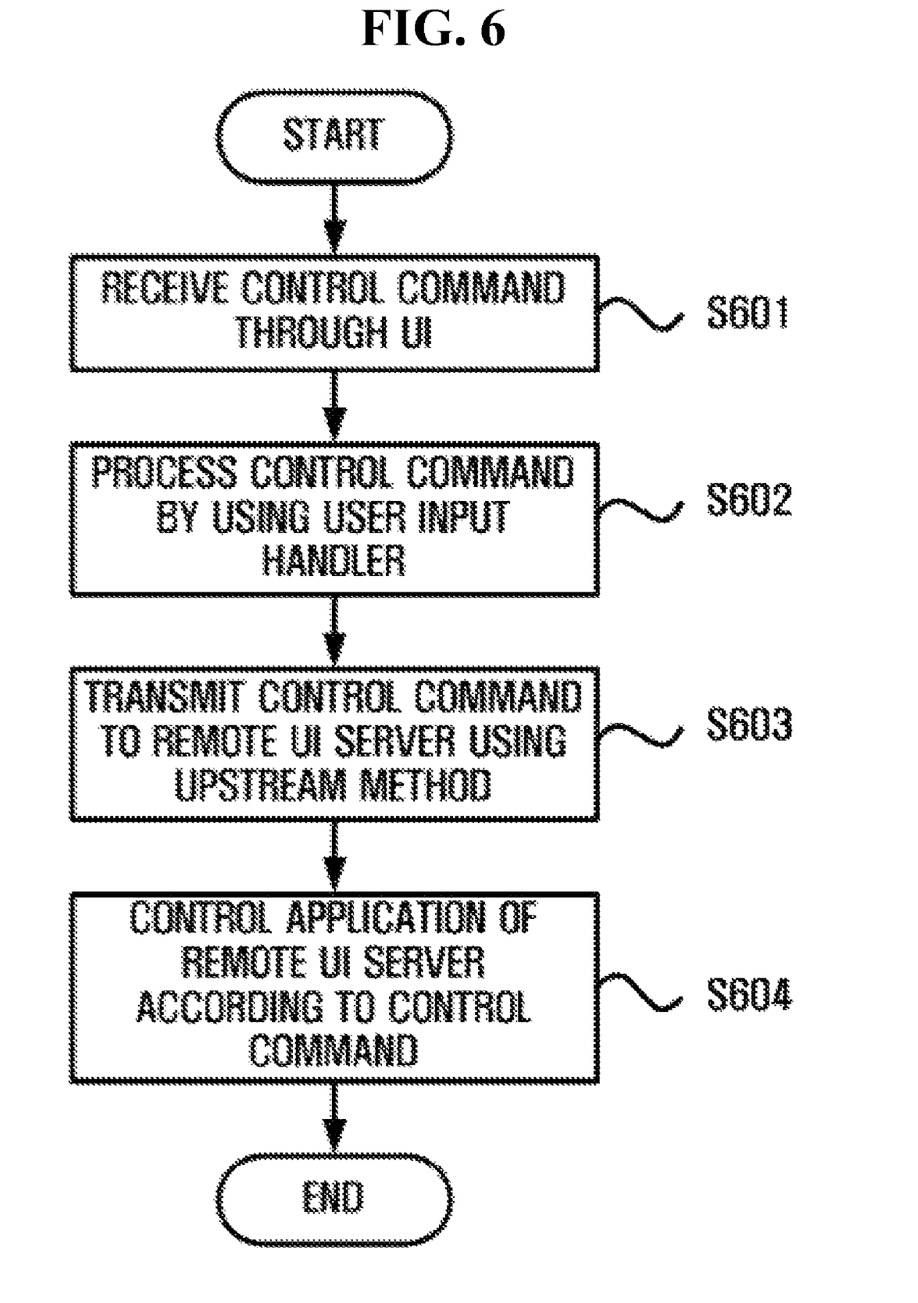
FIG. 6 illustrates a flowchart of a remote control method according to an exemplary embodiment of the present invention.

FIG. 6 illustrates a flowchart of a remote control method according to an exemplary embodiment of the present invention. Referring to FIG. 6, a user inputs a control command using a UI output by the UI output module of the remote UI client 200 (S601). More specifically, the user may identify a number of menu items displayed by the UI output module and input a control command by selecting one of the menu items using an input device such as a mouse or a keyboard.

The user input handler 230 processes the control command input by the user (S602). That is, the user input handler 230 controls the remote UI client 200 to process information input thereto with the aid of an input device such as a mouse or a keyboard by the user.

Once the control command input by the user is processed, the remote UI client 200 transmits the processed control command to the streaming server 120 of the remote UI server 100 by using a streaming method, and particularly, an upstream method (S603). Then, the streaming server 120 receives the user command transmitted by the remote UI client 200 and controls the application 150, which is provided by the remote UI server 100, according to the received user command (S604). That is, the remote UI server 100 analyzes and thus interprets the user command transmitted by the remote UI client 200. Thereafter, the remote UI server 100 transmits the user command transmitted by the remote UI client 200 to the application 150 so that the application 150 can be controlled.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A user interface (UI) server comprising:
an encoder which encodes a UI in a multimedia data format; and
a streaming server which transmits the encoded UI to a remote client having a UI output module using a multimedia streaming method,
wherein the UI is based on scene description information included in the multimedia data format,
wherein the UI server further comprises a device profile handler which receives a device profile comprising resolution of the UI output module as capability information of the remote client and generates UI information for the UI based on the capability information of the remote client, and
wherein the device profile handler performs capability matching using the received device profile and searches for the UI information suitable for the resolution of the UI output module of the remote client, wherein the streaming server receives a user command through the encoded UI and controls an application according to the received user command.

2. The UI server of claim 1, wherein the multimedia data format is a Moving Picture Experts Group (MPEG) format.

3. A user interface (UI) client comprising:
a decoder which receives a UI having a multimedia data format from a remote server and decodes the received UI; and
a UI output module which outputs the decoded UI,
wherein the UI is based on scene description information included in the multimedia data format, and
wherein the UI client further comprises a device profile storage module which stores a device profile comprising resolution of the UI output module as capability information of the UI output module, the received UI having been generated by performing capability matching, and searching for UI information suitable for the resolution of the UI output module by the remote server,
wherein the UI client controls the remote server by transmitting a user command received through the decoded UI to the remote server.

4. The UI client of claim 3, further comprising a user input handler which processes the user command received through the decoded UI.

5. The UI client of claim 3, wherein the decoder comprises a rendering device which renders the decoded UI.

6. The UI client of claim 5, wherein the rendering device renders the decoded UI based on a scene description included in the multimedia data format.

7. The UI client of claim 3, wherein the multimedia data format is a Moving Picture Experts Group (MPEG) format.

8. A remote control apparatus comprising:
a user interface (UI) server which transmits a UI having a multimedia data format; and
a UI client which displays the UI, receives a user command and controls the UI server according to the received user command, the UI client having a UI output module,
wherein the UI is based on scene description information included in the multimedia data format,
wherein the UI server receives a device profile comprising resolution of the UI output module as capability information of the UI client and generates UI information based on the capability information of the UI client, and
wherein the UI server performs capability matching using the received device profile and searches for the UI information suitable for the resolution of the UI output module of the UI client,
wherein the UI server comprises:
an encoder which encodes a UI in the multimedia data format; and
a streaming server which transmits the encoded UI using a multimedia streaming method.

9. The remote control apparatus of claim 8, wherein the UI client comprises:
a decoder which decodes the UI having the multimedia data format; and
a UI output module which outputs the decoded UI to a user.

10. The remote control apparatus of claim 8, wherein the multimedia data format is a Moving Picture Experts Group (MPEG) format.

11. A remote control method comprising:

enabling a user interface (UI) server to transmit a UI having a multimedia data format to a UI client having a UI output module;

enabling the UI client to display the UI; and enabling the UI client to control the UI server by transmitting a user command received through the UI to the UI server, wherein the UI is based on scene description information included in the multimedia data format, wherein the method further comprises enabling the UI server to receive a device profile comprising resolution of the UI output module of the UI client as capability information of the UI client and to generate UI information based on the capability information of the UI client, and wherein the enabling the UI server to receive the device profile and to generate the UI information comprises enabling the UI server to perform capability matching using the device profile and to search for the UI information suitable for the of the UI client, wherein the enabling the UI server to transmit the UI comprises:

encoding a UI in the multimedia data format; and transmitting the encoded UI to the UI client using a multimedia streaming method.

12. The remote control method of claim 11, wherein the enabling the UI client to display the UI comprises:

decoding the UI having the multimedia data format; and outputting the decoded UI to a user.

* * * * *